Feb. 14, 1967 A. F. KOPASKA Re. 26,159
FARM IMPLEMENT LIFT APPARATUS
Original Filed May 15, 1963 2 Sheets-Sheet 1
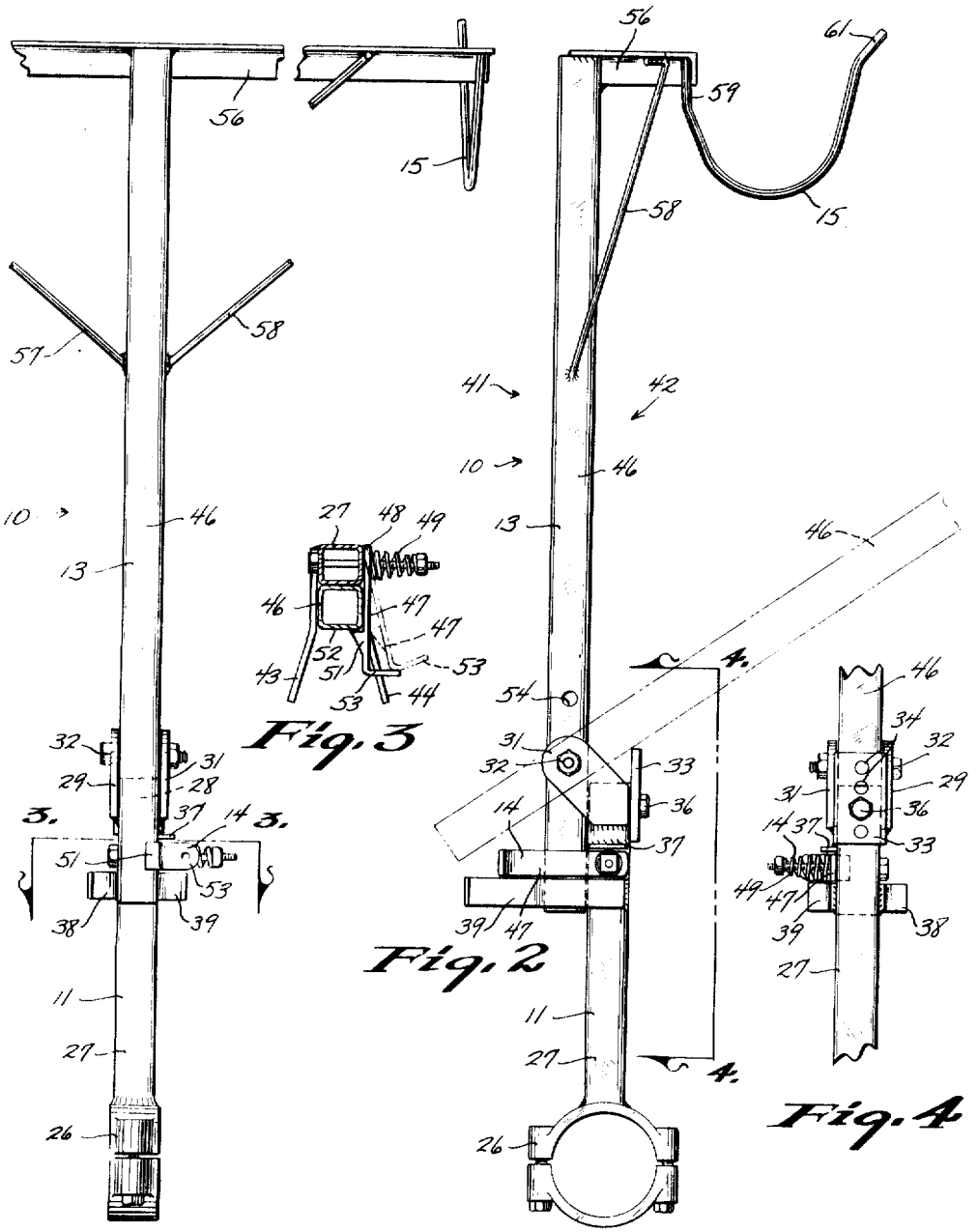
INVENTOR.
ARNOLD F. KOPASKA
BY
Dick, Zarley & Henderson
ATTORNEYS

FARM IMPLEMENT LIFT APPARATUS

Original Filed May 15, 1963 2 Sheets-Sheet 2

INVENTOR.
ARNOLD F. KOPASKA
BY
Dick, Zarley & Henderson
ATTORNEYS

United States Patent Office

Re. 26,159
Reissued Feb. 14, 1967

26,159
FARM IMPLEMENT LIFT APPARATUS

Arnold F. Kopaska, Rte. 4, Guthrie Center, Iowa 50115

Original No. 3,183,982, dated May 18, 1965, Ser. No. 280,615, May 15, 1963. Application for reissue Nov. 22, 1965, Ser. No. 521,227
9 Claims. (Cl. 172—624)

Matter enclosed in heavy brackets [ ] appears in the original patent but forms no part of this reissue specification; matter printed in italics indicates the additions made by reissue.

This invention relates generally to farm implements pulled by a tractor or other type of prime mover, and in particular to a harrow section which is loosely attached to a wheeled drawbar unit.

Although many structures, both manual and automatic, have been devised for lifting a harrow, many farmers still use the proven structure of a plurality of upstanding hangers secured to the drawbar unit, and onto which the farmer literally lifts the harrow section for supporting it above the ground during transportation, etc.

There are many disadvantages, however, to this structure, several of which are self-evident. A modern day harrow section is heavy for any man. The person lifting has to stand in front of the spike teeth, assuming a spike tooth harrow is being used, and has to engage the harrow such that the teeth tend to press against him. If the person should trip, or an accident occur, it is conceivable that he could be impaled by the teeth, should the harrow fall upon him.

It is therefore an object of this invention to provide an improved lift apparatus for a farm implement ordinarily tied behind a tractor drawn, wheeled drawbar unit.

It is another object of this invention to provide a safe lift apparatus for lifting, for example, a spike tooth harrow or the like which lessens the chance of injury due to lifting or accidental misplacement of the harrow.

Another object of this invention is the provision of a lift apparatus for a harrow or the like, which apparatus is adjustably attached to a wheeled drawbar, is pivotal to engage a ground supported harrow, and is again pivotal to a locked position wherein said harrow is securely supported off the ground, the lifting action being brought about by merely pushing the harrow against the apparatus.

Yet another object of this invention is to provide an apparatus for lifting one or more harrow sections off the ground, the aparatus having a knee action to permit a lowered condition to engage the harrow, and to permit raised condition to lift the harrow, the structure being locked in both conditions.

Still another object of this invention is the provision of an apparatus comprising structural elements arranged to attain the objectives listed hereinbefore, which apparatus is rugged of structure, economical of manufacture, and effective in service.

This object, and other features and advantages of this invention will become readily apparent upon reference to the following drawings, wherein:

FIG. 1 is a fragmentary, front elevational view of the lift apparatus of the invention;

FIG. 2 is a side elevational view of the lift apparatus, a lowered position of the lift arm shown by broken lines;

FIG. 3 is a cross-sectional view taken along lines 3—3 in FIG. 1;

FIG. 4 is a fragmentary view as taken on the line 4—4 of FIG. 2;

Figure 5:
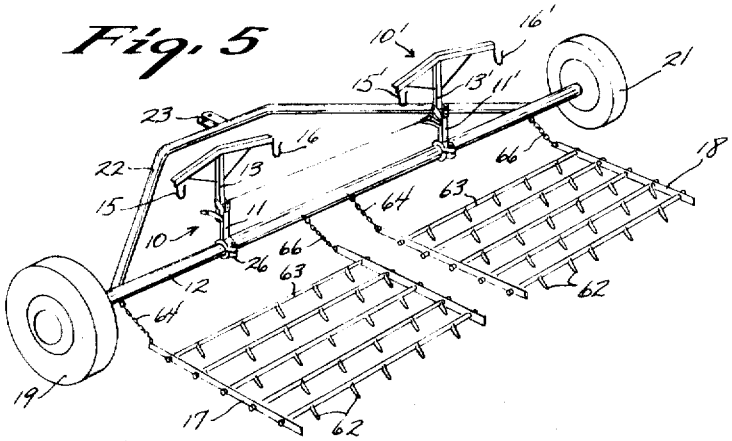
FIG. 5 is a reduced perspective view of a wheeled drawbar unit to which a pair of spike tooth harrow sections are attached, and to which a pair of interconnected lift apparatus are connected for joint action in response to operation by one individual.

Referring to the drawings, the lift apparatus of this invention is indicated generally at 10 in FIG. 1, and comprises a support unit 11 for adjustable engagement to a drawbar 12 (FIG. 5), a lift unit 13 movably engaged to the supporting unit 11, a locking unit 14 for locking the lift unit 13 to the unit 11 in an upstanding position, and a pair of hooks 15 and 16 for engaging and holding a harrow section, two sections 17 and 18 shown in FIG. 5.

The drawbar 12 (FIG. 5) extends in a transverse manner between a pair of wheels 19 and 21, and has connected adajcent its ends the end portions of an A-frame member 22 provided with a tongue unit 23 for connection to a prime mover, such as a farm tractor (not shown). This structure is generally designated at 24 in FIG. 5 and shall hereinafter be designated as the transport carrier.

To secure a lift apparatus 10 to the transport carrier drawbar 12, the support unit 11 is provided with a split ring-type clamp 25 (FIGS. 1 and 2), and from the upper part of which a bar 27 extends. At the extreme upper end 28 of the bar 27, a pair of ears 29 and 31 are mounted. The ears extend angularly upwardly from the bar end 28 in parallel relation and are provided at their outer ends with aligned openings (not shown) for the passage therethrough of a pivot bolt 32.

Secured to the face of the bar 27 opposite the ears 29 and 31 is a limit plate 33. To provide for the limit plate 33 to be secured to the bar 27 in vertically adjusted positions, a plurality of vertically spaced openings 34 are formed in the plate 33. A bolt 36 is inserted through any one of the openings 34 for securing the plate 33 to the bar 27.

At the lower edge of the plate 33, a flange 37 is secured to a side of the bar 27 for a purpose hereinafter described. Spaced further below the flange 37 are a pair of spring steel-type wings 38 and 39 secured on opposite sides of the bar 27 and extended in the same direction as the ears 29 and 31. For convenience of terminology, the front of the lift apparatus 10 is designated generally at 41 in FIG. 2, and the rear is designated generally at 42 (see also FIG. 7). The wings 38 and 39, as best seen in FIG. 3, flare outwardly at 43 and 44 to guide the elongated shaft 46 of the lift unit 13 into frictional engagement with the wings 38 and 39.

To hold the shaft 46 in an upstanding position as illustrated in full line in FIG. 2, the locking unit 14 comprises an L-shaped latch 47 (FIGS. 1–4). The latch 47 is held against vertical movement by the flange 37 above it, and by the wings 38 and 39 below. The rear portion 48 (FIG. 3) of the latch 47 is biased into flat engagement with a side of the bar 27 by a conventional spring device 49 secured to the bar 27. In this biased position, a cleat 51 formed on the inside of the latch 47 clampingly engages the front surface 52 of the shaft 46, the remainder of which is nested between the wings 38 and 39. The cleat 51 thus holds the shaft 46 in this position up against the bar 27.

To release the cleat 51 from its clamping engagement with the shaft 46, the angular kick portion 53 of the latch 47 may be moved outwardly from its full line position of FIG. 3 to the dotted line thereof, whereby the shaft 46 may be moved rearwardly from its upright position to its downward or lowered position. The latch 47 is moved outwardly against the bias of the spring device 49 by either the hand or the foot of the operator; however, the device 49 is placed sufficiently low for an easy kick movement of the foot.

Upon release of the shaft 46, and movement thereof to the lowered position, the latch 47 is immediately and automatically returned by the spring device 49 to its full line position of FIG. 3. Upon a return of the shaft 46 to its upright position, it engages the slant side of the cleat 51, and forces the latch 47 outwardly and out of its path until it is completely nested in an upright position, whereupon the latch 47 automatically returns to its clamping position.

The lift unit 13 includes the shaft 46, which is privotally connected to the ears 29 and 31 by having one or more vertically spaced pairs of transversely aligned holes 54 (FIG. 2) alignable with the ear openings for passage therethrough of the pivot bolt 32. The lift unit also includes a V-shaped (in plan view) bracket 56 secured to the upper end of the shaft 46 and laterally supported by a pair of struts 57 and 58. At the outer ends of the bracket 56, the hooks 15 and 16 are secured, each hook being substantially U-shaped and secured at one end 59 so that the other end 61 extends rearwardly. Referring to FIGS. 1 and 2, it will be seen that the outer end 59 of each hook is bent toward the horizontal, and extends slightly above the bracket 56.

In operation, a lift apparatus 10 may be used either singly or in pairs as shown by the provision of a pair of apparatus 10 and 10' in FIG. 5. Each harrow section 17 and 18, arranged side by side as illustrated, is a conventional commercially available unit having a plurality of spike teeth 62 extended angularly from a plurality of transversely extended rungs 63. The sections are connected to the drawbar 12 by a pair of chains 64 and 66. When used, the sections 17 and 18 lay flat with their teeth 62 engaging the ground, and with the chains pulled taut (see the fragment 17a of section 17 in FIG. 7).

Assuming for the moment that the harrow section 17 is to be lifted upwardly by the lift apparatus 10, and that the latter is mounted alone on the drawbar, the following operation is followed. The locking unit 14 is manipulated by the foot of the operator and the lift unit 13 is pivoted rearwardly to the lowered position of FIG. 7, the reraward movement stopped by the limit plate 33. The harrow section 17 is then lifted upwardly by the operator, who grasps the rear end 67 (FIG. 7) and pivots it about the ground engaging front end 68 in a forward direction.

Figure 7:
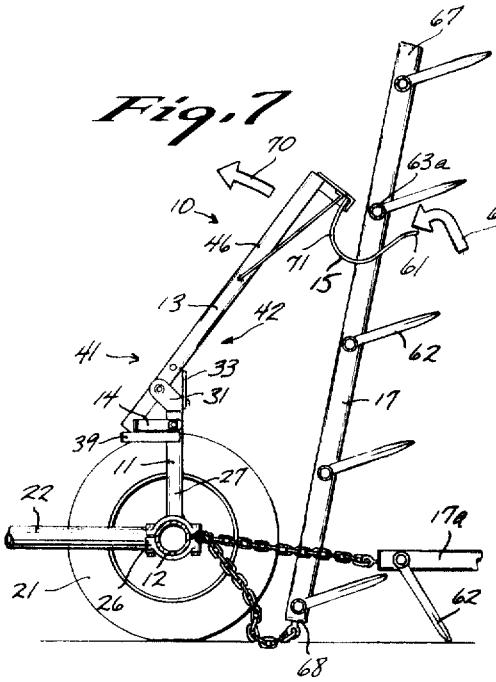
FIG. 7 is a side elevational view showing the lift apparatus in a lowered condition for engaging a ground engaging harrow section.
Figure 8:
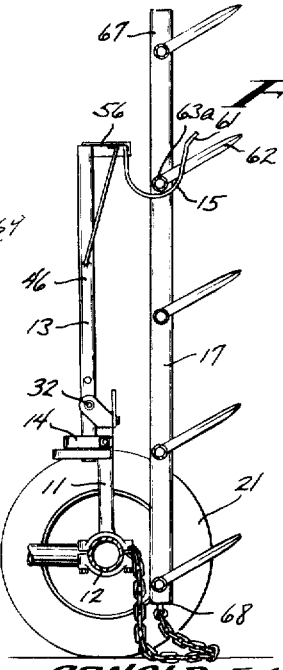
FIG. 8 is a view similar to FIG. 7 with the lift apparatus in its upstanding harrow supporting, transport position.

As indicated by the arrow 69 in FIG. 7, the rung 63a moves over the outer ends 61 of the two hooks 15 and 16. Further pivotal movement of the harrow section 17 causes the rung 63a to engage a rear portion 71 (FIG. 7) of each hook, whereupon continued forward pivotal movement of the section 17 now causes forward pivotal movement of the shaft 46 of the lift unit 13. As the operator continues to push forwardly on the hooked harrow section 17, the lift unit 13 moves from its lowered rearward position to the upstanding position, as indicated by the arrow 70, with the harrow section 17 lifted completely off the ground as best illustrated in FIG. 8. The section 17 is now ready for transport.

To return the harrow section 17 to its ground engaging position, the operator need merely stand in front 41 of the lift apparatus 10 and actuate the spring device 49 to release the lift unit shaft 46. By virtue of the over-center retention of the harrow section 17, whereas the rung 63a rests in the hooks 15 and 16 (FIG. 8) in a position rearward of the pivotal connection 32 of the lift unit 13 with the support unit 11, the weight of the section 17 causes the lift unit 13 to buckle or pivot rearwardly. The harrow section then abuts the ground at its lower end 67, its weight continues to pivot the lift unit 13 rearwardly until the hooks 15 and 16 are sufficiently low that the section 17 falls rearwardly and away from the hooks to the ground, due to its weight. It is seen thereby that the return of the harrow section to the ground engaging position is semi-automatic.

Figure 6:
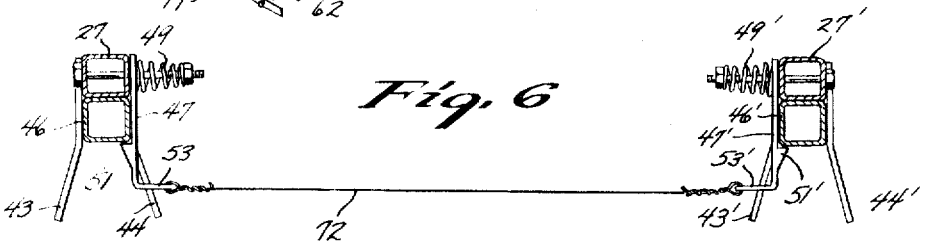
FIG. 6 is an enlarged, sectional view of the lift apparatus of FIG. 5 similar to the view of FIG. 3.

Referring now to FIGS. 5 and 6, a pair of lift apparatus 10 and 10' have been affixed to the drawbar 12, each being located at approximately the mid point of the respective harrow sections 17 and 18 disposed rearwardly of the transport carrier 24. The lift apparatus 10' is identical to the apparatus 10 with the exception of the latch 47' being placed on the inner side of the bar 27', as compared to the latch 47.

A rope or cable 72 is affixed to each kick portion 53 and 53' and is stretched taut therebetween. Then when the operator desires to release the spring devices 49 and 49', all he need do, for example is place his foot against the cable 72 near its center and push forwardly toward the carrier 24 and against the bias of the spring devices. Both lift units 10 and 10' are then free to move out of their upright positions.

In summation, a harrow section lift apparatus has been described herein which is easily operated to take the place of the farmer in the lifting of a harrow section to an off-ground transport position.

Some changes may be made in the construction and arrangement of my farm implement lift apparatus without departing from the real spirit and purpose of my invention, and it is my intention to cover by my claims, any modified forms of structure or use of mechanical equivalents which may be reasonably included within their scope.

I claim:

1. In combination with a wheeled transport carrier having a drawbar with at least one harrow section chained therebehind, said carrier having rearward and forward ends and said harrow section having rearward and forward ends and a plurality of rungs extending thereacross substantially at right angles to the direction of travel of said carrier, at least one support unit, having upper and lower ends, secured to said drawbar for each harrow section chained to said drawbar, an elongated member vertically pivotally secured adjacent its lower end to the upper end of said support unit and adapted to pivot rearwardly to a predetermined position at times and adapted to be pivoted forwardly to a predetermined position at times, said elongated member having a hook means secured thereto adjacent its upper end which is adapted to receive one of said rungs of said harrow section when said elongated member is in its rearward predetermined position and the rearward end of said harrow section is pivoted upwardly about its forward end, said elongated member adapted to pivot forwardly as said harrow section is pivoted about its forward end after said hook means has received said rung; said elongated member and said hook means causing the forward end of said harrow section to be raised from its supporting surface as said elongated member is pivoted to its forward predetermined position, whereby said harrow section will be placed in a transport position, and means for selectively maintaining said elongated member in its forward predetermined position.

2. The combination of claim 1 wherein said hook means extends rearwardly from said elongated member.

3. The combination of claim 1 wherein said means for maintaining said elongated member in its forward predetermined position includes an arm spring biased into clamping engagement with said elongated member.

4. The combination of claim 1 wherein at least two harrow sections are chained to said drawbar and two support units are secured to said drawbar and wherein an interconnecting means extends between the means for selectively maintaining said elongated members in their forward predetermined positions for the simultaneous operation thereof.

5. In combination with a wheeled transport carrier having rearward and forward ends, said carrier having at least one harrow section having a plurality of transverse, spaced rungs secured to its rearward end, a support unit secured to said carrier, a lift unit pivotally secured adjacent its lower end to said support unit and movable from an upstanding position to a rearward inclined position, hook means on said lift unit adapted to receive one of said rungs when said lift unit is in its rearward inclined position and the rearward end of said harrow section is pivoted upwardly about its forward end, said lift unit adapted to pivot forwardly as said harrow section is pivoted about its forward end after said hook means has received said rung; said lift unit and said hook means causing the forward end of said harrow section to be raised from its supporting surface as said lift unit is moved to its upstanding position whereby said harrow section will be placed in a transport position, and means for selectively locking said lift unit in its upstanding position.

6. The combination of claim 5 wherein the upper end of said lift unit and the rearward end of said harrow section are adapted to pivotally move rearwardly when said selectively locking means are disengaged; said harrow section rung disengaging from said hook means when said lift unit substantially reaches said rearward inclined position thereby allowing the rearward end of said harrow section to pivotally move downwardly about said harrow section forward end until said harrow section is substantially horizontal.

*7. In a wheeled transport carrier including a drawbar adapted to pull at least one harrow section located rearwardly thereof, a mechanism for lowering a harrow section into contact with the ground and for lifting said harrow section from contact with the ground, said mechanism including:*

*a lift unit mounted on the drawbar for movement between a forward position and a rearward position in which the lift unit extends rearwardly towards the harrow section,*

*means attached to said lift unit for supporting a harrow section off the ground with said means being engageable with and disengageable from said harrow section when said lift unit is substantially in said rearward position, and*

*means for selectively maintaining said lift unit in its forward position.*

*8. The structure of claim 7 further characterized in that said means attached to the lift unit for supporting a harrow section includes a hook.*

*9. The structure of claim 7 further characterized in that said means attached to the lift unit for supporting a harrow section includes a hook opening towards the top of said lift unit so that the hook opens generally upwardly when said lift unit is in its forward position and opens generally rearwardly when said lift unit is in its rearward position so that said harrow section automatically disengages from said hook as said lift unit approaches said rearward position and engages with said hook as the harrow section is raised from the ground operatively in contact with said lift unit.*

References Cited by the Examiner

The following references, cited by the Examiner, are of record in the patented file of this patent or the original patent.

UNITED STATES PATENTS

| | | | |
|---|---|---|---|
| 1,015,393 | 1/1912 | Murphy | 214—77 |
| 2,828,597 | 4/1958 | Moore. | |
| 2,978,042 | 4/1961 | Jones | 172—456 X |
| 3,086,598 | 4/1963 | Gellner | 172—456 |

FOREIGN PATENTS

| | | |
|---|---|---|
| 21,776 | 1902 | Great Britain. |
| 596,337 | 7/1959 | Italy. |

ANTONIO F. GUIDA, *Acting Primary Examiner.*

ABRAHAM G. STONE, R. L. HOLLISTER,
*Assistant Examiners.*